March 13, 1945. F. ALZOLA 2,371,208
SYSTEM OF CONTINUOUS FERMENTATION
Filed Oct. 13, 1941
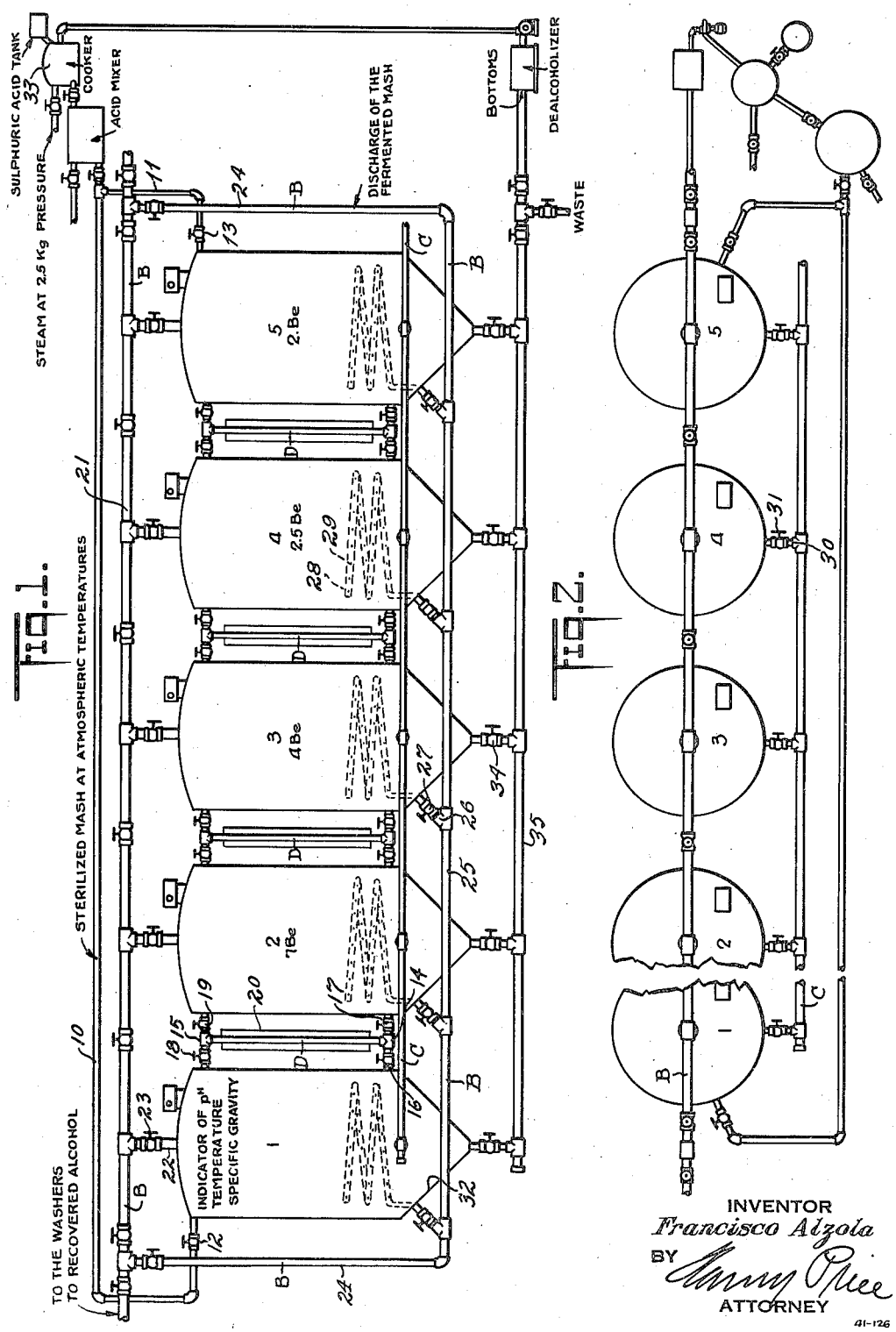
INVENTOR
*Francisco Alzola*
BY
ATTORNEY Patented Mar. 13, 1945

2,371,208

UNITED STATES PATENT OFFICE 2,371,208

SYSTEM OF CONTINUOUS FERMENTATION

Francisco Alzola, Habana, Cuba

Application October 13, 1941, Serial No. 414,829
In Cuba October 14, 1940

2 Claims. (Cl. 195—37)

The present invention relates to the art of fermentation.

In conventional practice there may be a continuous propagation of fermenting agent such as yeast, but the fermentation is intermittent, fresh mash being fed to each fermentation vessel until the same is filled.

An object of the present invention is to effect continuity both in the yeast propagation and in the fermentation of the mash, with increase in efficiency and corresponding reduction in the size of plant required for a given output, and the invention is concerned with the method or process and with equipment for carrying such method into execution.

The invention has a wide field of applicability to the production of alcohol or alcoholic product from liquids or solids containing carbohydrates and has particular utility for the production of ethyl alcohol from molasses, but is of wider applicability to biochemical fermentation of any of various liquids or solids that contain carbohydrates.

The method of the invention involves multi-stage fermentation, the fresh fermenting agent being introduced only in the first stage, together with the sterile mash which is progressively introduced either continuously or intermittently, the partially fermented mash passing onward by overflow, together with entrained fermenting agent to the second stage and thence overflowing to the third and subsequent stages until the fermentation is completed in the final stage.

Desirably, the fermentation in each stage is conducted in a separate fermentation vessel and the flow from each stage to the next is through a connecting pipe through which overflow occurs from each filled fermentation vessel to the next one in the sequence. The overflowing mash as it passes from each stage to the next is cooled to degree such as to assure the optimum conditions for promotion of the fermentation at the subsequent stage.

All fermenter tanks or stages in use work full, excepting the one from which withdrawals are being made, each is emptied only at the completion of fermentation therein. Refrigeration is not necessary in the first tank, since the entering mash is cool.

Inasmuch as there is a vigorous evolution of carbon dioxide gas in the early stages of fermentation and a tendency for the yeast to settle in the final stages due to lack of activity, because of the deficiency of fermentable constituents in the final stages, it is another feature to convey the excess carbon dioxide gas evolved in the early stages with or without additional gas to the tanks in which the final stage or stages of fermentation are performed.

The progress of fermentation in the successive stages may be readily determined by measuring the progressively decreasing sugar content thereof as for instance by convenient determination of degrees Baumé as suggested in the drawing.

When the fermentation is completed in the final stage of the sequence, the contents may be ejected from the final tank and the alcohol may be recovered from the fermented mash in conventional manner.

In the event of infection or degeneration of the ferment, this progression is terminated and the tank which provides the final stage of fermentation is permitted to complete its action, and then its entire contents are purged.

After the discharged tank has been cleaned, it will be used as the first stage, fresh fermenting agent and sterile mash being introduced thereinto in the manner above described, and the sequence of operation is reversed to feed overflow in succession from said final stage, which is now the initial stage, progressively to the first stage which has now become the final stage.

As the fermentation in each intermediate stage is completed the contents are discharged in the manner previously set forth and after sterilizing, said tank becomes recharged from the initial tank. Fresh fermenting agent and sterile mash are introduced only in the first or the last of the tanks or stages, depending on the direct or inverse sequence of operation set forth.

The method is best carried out by an installation also claimed herein, one embodiment of which is shown in the accompanying drawing, in which Fig. 1 is a side elevation of a fermenting installation according to the present invention, and Fig. 2 is a plan view thereof.

Referring now to the drawing, there is shown a system of multi-stage fermentation, illustratively, in five stages. Each stage of the fermentation is conducted in a fermentation tank or vessel, said vessels being identified respectively by numerals 1, 2, 3, 4 and 5.

Sterilized mash at atmospheric temperature is introduced through a horizontal pipe 10 which communicates at one end with the top of vessel 1 and has a branch 11 communicating with the top of the final vessel 5. Valves 12 and 13 control the inflow selectively to tank 1 or tank 5, depending upon the direction of operation. The successive tanks are connected in series. The connection between each tank and the next in sequence comprises a pipe 14 connecting the lower parts of the tanks, a similar pipe 15 connecting the upper parts thereof, and an upright pipe D connects the midsections of said horizontal pipes. Hand-controlled valves 16 and 17 are near opposite ends of the horizontal pipe 14, that is, at opposite sides of the pipe D and like valves 18 and 19 are similarly arranged in the upper horizontal pipe 15.

Coolers 20, diagrammatically shown, intervene between consecutive tanks, and these are controlled to determine the temperature at which each stage of fermentation is to occur.

A horizontal pipe is provided which has a run 21 above the tanks and is connected by branches 22 with the interiors of the respective tanks, each of said branches having a controlling hand-operated valve 23. Run 21 is connected at its ends with upstanding pipe sections 24 joined to a lower horizontal run 25 near the bottom of the tanks. Branches 26 controlled by valves 27 feed from the lower pipe into coils 28 perforated at 29 that are in the interiors of the respective tanks.

A horizontal pipe C connected by branches 30 to the several tanks serves for applying fluid under pressure, useful in discharging and cleaning the tanks, as desired. Valves 31 selectively control said discharge operation.

The tank bottoms 32 are conical, and residues or bottoms are extracted therefrom as fast as they are formed, for outflow through valve 34 to pipe 35. Part of the bottoms extracted may be transferred to a cooker 33, there to be subjected to the action of sulphuric acid and heat, under pressure, in order to apply such treated residues as nutrients, continuously to the fermentation.

In normal operation fresh yeast or other fermenting agent is introduced into the initial stage or tank 1. Valve 12 is opened for introduction either continuously or intermittently, of sterile mash into the first stage or tank 1. In the connection between tank 1 and tank 2, diagonally opposite valves, (16 and 19 or 17 and 18, as desired) are opened, while the remaining diagonally opposed valves 17 and 18 or 16 and 19 respectively are closed. After the initial tank becomes filled with mash the introduction of further sterile mash therewith results in overflow therefrom through pipe D with fermenting agent entrained therewith, for admission into the next tank 2. In similar manner, the second tank, after it is filled, will overflow to the third tank 3 and thus the fermentation will be progressively advanced in the consecutive stages or tanks for completion in the final tank 5. Appropriate cooling at each stage effected through the intervening cooling element assures the optimum condition of fermentation at each stage.

In order to facilitate contact of yeast with non-fermented sugars in the last stages of fermentation, I produce an agitation in the mash in the last fermenters wherein the proportion of soluble non-sugar solids to non-fermented sugars is unfavorable.

To be able to obtain this agitation, or motion, carbon dioxide liberated in the first fermenters, where generation is high, due to the great activity of fermentation, is injected into the last fermenters by means of tube B through perforated coils 28 in the last fermenters, the slight pressure in the first fermenters being utilized for the purpose, or a compressor (not shown) installed for the purpose. The carbon dioxide, upon penetrating those mashes rich in alcohol, entrains a substantial amount of the latter, which is subsequently recovered in the scrubbers. Through the utilization of carbon dioxide thus generated the system offers the opportunity of producing automatic and costless agitation of sluggish mashes, nearing the end of their fermentation, thus favoring the life conditions of the fermenting agent.

This invention has particular utility for the production of ethyl alcohol from final molasses, that is to say, from raw materials rich in salts. It is well known that the abundance of salts contained in final molasses does not only cause an excessive multiplication of the yeast cells, with the corresponding loss of sugars in the formation of the cellular structure thereof, but due to the osmotic action of such salts on said cells, the latter are poisoned and perish. As is well known, yeast operates by osmosis and when fermentation has attained its last stages, the cell is surrounded by a medium very rich in salts and poor in sugars. Although not all residual sugars are fermentable, a great proportion of them are. And according to tests by me undertaken, the toxic effect of non-sugar soluble solids is mitigated when movement is imparted to the mass, and more so, when the movement is produced by $CO_2$. This is so not only due to the distribution of the yeast and its more intimate contact with the residue of sugar, but because the gas surrounds the cells and thus protects them from the toxic action of non-sugar soluble solids. The great multiplication of cells ordinarily taking place in raw materials of this class, is offset according to my process, by the relatively small amount of yeast that passes into the corresponding fermenters.

Thus all mashes work in agitation, from the tanks which are in full fermentation to those approaching completion, and even in those where it has already ended. Oxidation is avoided in the latter mashes, by the introduction of the carbon dioxide.

The upper, internal portion of the tanks is to be intensely illuminated with red light, especially in those where fermentation is in its first stages, since the high concentration of mashes in these stages keeps the greater portion of the yeast at or near the surface, where it can best receive the impact of these rays and thus accelerate the development of the said yeast.

The incoming mash is acidulated to a point where the most favorable pH is obtained, ammonium sulphate and the necessary stimulants then being added. In tanks where fermentation is only half completed, substances that are useful at this stage may be added; and in tanks where the ratio of soluble non-sugar solids to unfermentable sugars is unfavorable to yeast development, substance useful for the purpose may be added, either continuously or intermittently.

It will be understood that by opening valves 18 and 17 between successive stages the mash is introduced through the bottom of each stage, so that the active constituents of gas from the earlier stages will contribute to agitation in the later stages. However, the reverse arrangement, that is, the introduction of the mash through the top of each stage will also accomplish like agitation if gas is introduced into the earlier stages by a compressor (not shown).

When the fermentation has been completed in the final tank 5 it is expelled therefrom by fluid applied thereto through pipe C by opening valve 30, the corresponding valves to the other tanks remaining closed. Thus the fully fermented mash is expelled past valve 34 to pipe 35, and then treated in any usual way for recovery of the alcohol therefrom.

Whenever the cultures become infected, or degenerate, it is necessary to stop the introduction of mash, purge the tanks and restart the system. In present batch practice, this is accomplished by permitting the particular tank to proceed to maximum fermentative production of the desired product, and then draining, cleaning and sterilizing the tank, and instituting a new fermentation therein by fresh mash and fresh ferment. When fermentation heretofore has been effected by a cascade procedure of passage through a sequence of fermenting tanks, it has been necessary to throw the entire battery out of service; and the restarting is effected in tank 1.

In accordance with the present invention, a simple procedure of restarting is employed with the illustrated apparatus, by which in effect the direction of progression through the fermentation stages is reversed. This is accomplished by closing the supply valve 12 and connections between the several states and permitting the fermentation of the already-present mash to progress to completion without completing the progression through the series of tanks. Tank 5, which has been the final stage, is first completed and is emptied through valve 34 to the pipe 35 leading to the still; the tank is then cleaned and sterilized, and then charged, by opening valve 13, with fresh sterile mash and a fresh seed of ferment so that it proceeds to operate at high concentration of fermentable material as above described for tank 1 in the first progression.

Thus the fermentation in the original progression continues until the fermentation in tank 4 has been completed. Tank 4 is thereupon drained and sterilized in the manner above described, and the valve connection with tank 5 is opened, so that tank 4 is now charged by overflow from tank 5, which is now the initial stage of operation in the new progression. In succession, tank 3, tank 2 and tank 1 complete their work; and they are individually emptied, cleaned and sterilized and then charged by overflow from the adjacent tank in the new progression, that is in a reverse order from that of the described first progression. Thus ultimately the battery of tanks is again in full operation in a second progression, but in reverse order to the operation in the first progression. It will be noted that only one tank or stage need be out of action at a time; and that the reversal can be effected as often as required by the behavior of the ferment. In each case, the planting of new culture, obtained from the laboratory, is effected in that tank which was last to effect fermentation in the preceding progression, and the working order and direction of movement of the mash during fermentation is inverted.

Various valve settings including the carbon dioxide delivery are now reversed so that the relationship previously described is completely reproduced from right to left in the drawings rather than from left to right.

The setting of the valves for operation, either from the left or from the right, as the case may be, is readily effected. Only the initial tank in the cycle of operation (whether it be tank 1 or tank 5) is the point of admission of fresh fermenting agent and sterile mash to the cycle of operation.

The advantages attained by the process and equipment of the present invention are considerable. Among these are economy of labor, shortening of the fermentation cycle, ease of control, reduction in the toxic products of metabolism at the final stages of fermentation and higher yield, the various tanks normally operating full, and the entire output passing through all of the tanks in sequence.

While the invention has been described in connection with an anaerobic action, it will be understood that the process is also applicable to an aerobic action in which air would be introduced rather than carbon dioxide.

I claim:

1. The method of multi-stage continuous ethanol fermentation which consists in introducing yeast and initial mash containing fermentable material into a first stage for action therein at the highest concentration of said fermentable material, continuing the fermentation in a first progression of stages by delivering outflow of partly fermented mash with entrained yeast from the upper part of the first stage to the lower part of the second stage, and thence progressively from the upper part of each stage to the lower part of the next-following stage with progressive reduction in the concentration of fermentable material for completion of the fermentation of the mash at the lowest concentration of fermentable material in the final stage, each stage being kept full by the flow received from the next-preceding stage, stopping the outflow from stage to stage and effecting completion of fermentation within the individual stages, discharging and cleaning the final stage when fermentation is completed therein, starting a new progression of fermentation by introducing initial mash and yeast into the formerly final stage for initial fermentation therein, successively discharging and cleaning the other stages as fermentations are completed therein, and establishing a new multi-stage progression through successive stages by delivering outflow of partly-fermented mash and entrained yeast from the upper part of the formerly final stage to the formerly next-final stage and thence progressively from the upper part of each stage to the lower part of the next stage in the reverse order as the successive stages are cleaned wherewith the fermentation of mash at the lowest concentration of fermentable material is accomplished in the formerly first stage, whereby at least some stages are kept in production during the cleaning operations.

2. The method of multi-stage continuous ethanol fermentation which consists in introducing yeast and initial mash containing fermentable material into a first stage for action therein at the highest concentration of said fermentable material, continuing the fermentation in a progression of stages by delivering outflow of partly fermented mash with entrained yeast from the upper part of the first stage to the lower part of the second stage, and thence progressively from the upper part of each stage to the lower part of the next-following stage with progressive reduction in the concentration of fermentable material for completion of the fermentation of the mash at the lowest concentration of fermentable material in the final stage, with the evolution of a large volume of carbon dioxide gas in the latter stages; and including maintaining at least one early stage closed during the fermentation therein whereby to collect the evolved carbon dioxide gas under pressure, and injecting the said gas by the action of the collection pressure into a later stage and near the bottom of the mash therein, whereby to provoke an agitation in said mash and augment the efficiency of fermentation in said later stage.

FRANCISCO ALZOLA.